United States Patent
Yamamoto

(10) Patent No.: US 7,564,646 B2
(45) Date of Patent: Jul. 21, 2009

(54) RECORDING MEDIUM DRIVE INCLUDING ELECTROSTATIC ACTUATOR BETWEEN HEAD SLIDER AND RECORDING MEDIUM

(75) Inventor: Kenrou Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 356 days.

(21) Appl. No.: 11/415,219

(22) Filed: May 2, 2006

(65) Prior Publication Data
US 2007/0188913 A1    Aug. 16, 2007

(30) Foreign Application Priority Data
Feb. 16, 2006    (JP)    ............... 2006-038895

(51) Int. Cl.
*G11B 5/012*    (2006.01)
(52) U.S. Cl. .................................. 360/97.01
(58) Field of Classification Search ............ 360/75, 360/71, 97.01
See application file for complete search history.

(56) References Cited

U.S. PATENT DOCUMENTS

| | | | |
|---|---|---|---|
| 6,359,746 B1 | 3/2002 | Takekado et al. | 360/75 |
| 6,366,416 B1 | 4/2002 | Meyer et al. | 360/25 |
| 6,700,724 B2 | 3/2004 | Riddering et al. | 360/69 |
| 6,876,509 B2 | 4/2005 | Bonin et al. | |
| 6,967,805 B1 | 11/2005 | Hanchi et al. | 360/75 |
| 2002/0097517 A1 | 7/2002 | Bonin et al. | 360/75 |
| 2002/0118483 A1 | 8/2002 | Meyer et al. | 360/75 |
| 2003/0043497 A1 | 3/2003 | Riddering et al. | 360/75 |
| 2003/0169526 A1 | 9/2003 | Minoshima et al. | 360/31 |
| 2004/0233568 A1* | 11/2004 | Rao et al. | 360/75 |
| 2005/0007687 A1 | 1/2005 | Feng et al. | 360/75 |
| 2005/0088770 A1* | 4/2005 | Saliba et al. | 360/71 |
| 2005/0088772 A1* | 4/2005 | Baumgart et al. | 360/75 |
| 2006/0285243 A1* | 12/2006 | Baumgart et al. | 360/75 |

FOREIGN PATENT DOCUMENTS

JP    9-259556    10/1997

OTHER PUBLICATIONS

European Search Report dated Nov. 20, 2007.

* cited by examiner

*Primary Examiner*—Tianjie Chen
(74) *Attorney, Agent, or Firm*—Fujitsu Patent Center

(57) ABSTRACT

A slider body of a head slider has a medium-opposed surface opposed to a recording medium in a recording medium drive. A head element is mounted on the slider body. A charge region is established on the slider body for holding an electric charge at a local area in the medium-opposed surface of the slider body. The charge region is located at a position distanced from the head element. Capacitance is stored between the head slider and the recording medium. The capacitance serves to determine the distance between the head slider and the recording medium. In this case, electric potential concentrates at the charge region, so that electrospark concentrates at the charge region. The head element can be distanced from the electrospark. The head element can thus be prevented from destruction.

6 Claims, 7 Drawing Sheets

RECORDING MEDIUM DRIVE INCLUDING ELECTROSTATIC ACTUATOR BETWEEN HEAD SLIDER AND RECORDING MEDIUM

BACKGROUND OF THE INVENTION

1. Field of the Invention

The present invention relates to a recoding medium drive such as a hard disk drive, HDD, for example. In particular, the invention relates to a recording medium drive including a head element supported on a head slider opposed to a recording medium.

2. Description of the Prior Art

It is proposed to form an electrostatic actuator between a magnetic recording disk and a flying head slider in a hard disk drive, as disclosed in U.S. Pat. No. 6,876,509, for example. Electric power is supplied to the flying head slider from a carriage supporting the flying head slider in the hard disk drive. The flying height of the flying head slider depends on the amount of the supplied electric power.

A reduction in the flying height of the flying head slider tends to induce electrospark between the flying head slider and the magnetic recording disk in the hard disk drive. Since the outflow end of the flying head slider usually gets closest to the magnetic recording disk in the hard disk drive, electrospark is generated between the outflow end of the flying head slider and the magnetic recording disk. This results in a burn of the head element located adjacent to the outflow end. Destruction of the head element is inevitable. Accordingly, the flying head slider is not allowed to approach the magnetic recording disk as expected.

SUMMARY OF THE INVENTION

It is accordingly an object of the present invention to provide a recording medium drive reliably enabling a head slider to further approach a recording medium.

According to a first aspect of the present invention, there is provided a head slider comprising: a slider body having a medium-opposed surface opposed to a recording medium; a head element mounted on the slider body; and a charge region holding an electric charge at a local area in the medium-opposed surface of the slider body, said charge region located at a position distanced from the head element.

Capacitance is stored between the head slider and the recording medium. The capacitance serves to determine the distance between the head slider and the recording medium. In this case, electric potential concentrates at the charge region, so that electrospark concentrates at the charge region even if the electrospark is induced between the head slider and the recording medium. The head element can be distanced from the electrospark. The head element can thus be prevented from destruction. In general, a reduction in the distance between the head slider and the recording medium is supposed to accelerates generation of an electrospark therebetween.

An atomic ion may be implanted into the medium-opposed surface at the charge region in the head slider, for example. The atomic ion may be electrified to have either a positive polarity or a negative polarity. The charge region can be established on the head slider in a rather facilitated manner by employing the implantation of atomic ions.

The charge region may be established in an air bearing surface defined in the medium-opposed surface, for example. The air bearing surface usually gets closest to the recording medium in the head slider. The flying height of the head slider can thus reliably be controlled based on the capacitance held between the charge region and the recording medium.

According to a second aspect of the present invention, there is provided a recording medium drive comprising: a recording medium; a head slider having a medium-opposed surface opposed to the recording medium; a head element mounted on the head slider; a charge region holding an electric charge at a local area in the medium-opposed surface of the head slider, said charge region located at a position distanced from the head element; and a voltage source applying voltage to the recording medium.

When voltage is applied to the recording medium from the voltage source, capacitance is stored between the charge region and the recording medium in the recording medium drive. The capacitance causes an attraction or a repulsion. The distance is thus controlled between the recording medium and the head slider based on the intensity of the applied voltage. Moreover, even though the head slider gets closest to the recording medium, electrospark is avoided therebetween. The flying height of the head slider can be minimized. The head slider is thus allowed to reliably get closer to the recording medium. The reduction in the flying height significantly contributes to realization of a higher recording density.

An atomic ion may be implanted into the medium-opposed surface at the charge region in the recording medium drive in the same manner as described above. The charge region may be established in an air bearing surface defined in the medium-opposed surface in the same manner as described above.

According to a third aspect of the present invention, there is provided a method of controlling a head slider, comprising applying voltage to a recording medium for storing capacitance between the recording medium and the head slider opposed to the recording medium.

The method allows generation of an attraction or a repulsion between the head slider and the recoding medium in response to the application of the voltage. The distance is controlled between the recording medium and the head slider based on the intensity of the applied voltage. Even though the head slider gets closest to the recording medium, electrospark can be avoided therebetween.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
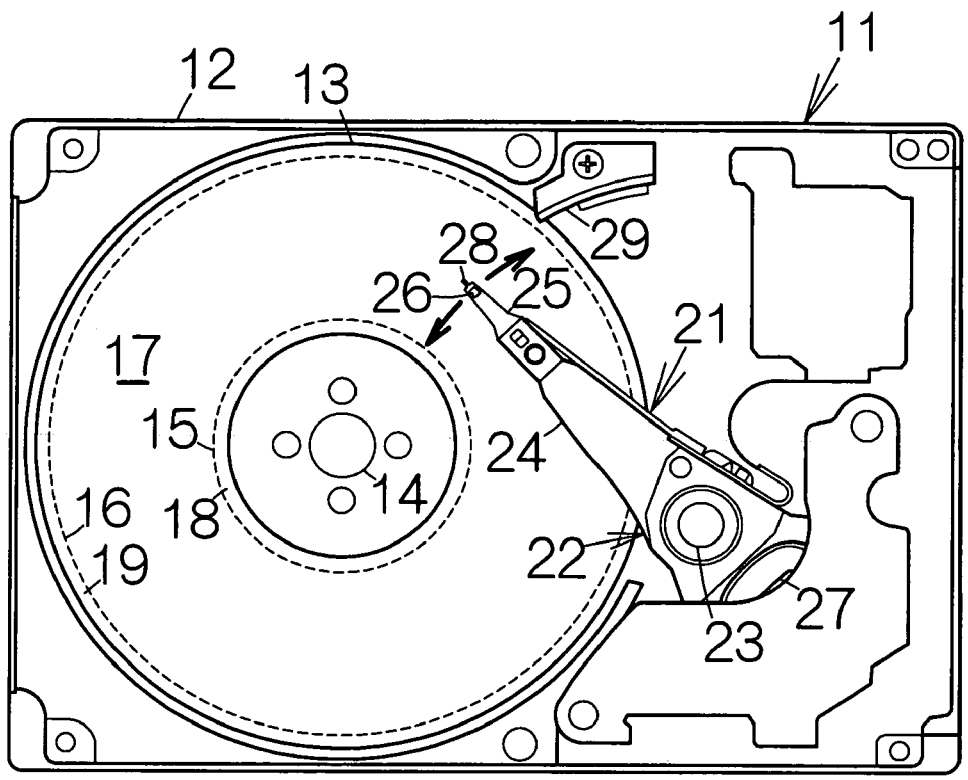
FIG. 1 is a plan view schematically illustrating the inner structure of a hard disk drive (HDD) as an example of a recording medium drive according to an embodiment of the present invention.

FIG. 1 schematically illustrates the inner structure of a hard disk drive, HDD, 11 as an example of a recording medium drive or storage device according to the present invention. The hard disk drive 11 includes a box-shaped enclosure 12 defining an inner space of a flat parallelepiped, for example. The enclosure 12 may be made of a metal material such as aluminum, for example. Molding process may be employed to form the enclosure 12. A cover, not shown, is coupled to the enclosure 12. The cover closes the opening of the enclosure 12. Pressing process may be employed to form the cover out of a plate material, for example.

At least one magnetic recording disk 13 as a recording medium is enclosed within the inner space of the enclosure 12. The magnetic recording disk or disks 13 are mounted on the driving shaft of a spindle motor 14. The spindle motor 14 drives the magnetic recording disk or disks 13 at a higher revolution speed such as 5,400 rpm, 7,200 rpm, 10,000 rpm, or the like.

A data zone 17 is defined between an innermost recording track 15 and an outermost recording track 16 on the surface of the magnetic recording disk 13. Recording tracks are formed in concentric circles within the data zone 17. Magnetic bit data is recorded onto the recording tracks. A non-data zone 18 is defined inside the innermost recording track 15. An on-data zone 19 is defined outside the outermost recording track 16. No magnetic bit data is recorded onto the non-data zones 18, 19.

A head actuator member, namely a carriage 21, is also incorporated within the inner space of the enclosure 12. The carriage 21 includes a carriage block 22. The carriage block 22 is supported on a vertical support shaft 23 for relative rotation. Carriage arms 24 are defined in the carriage block 22. The carriage arms 24 are designed to extend in a horizontal direction from the vertical support shaft 23. The carriage block 22 may be made of aluminum, for example. Molding process may be employed to form the carriage block 22, for example.

A head suspension 25 is attached to the front or tip end of the individual carriage arm 24. The head suspension 25 is designed to extend forward from the carriage arm 24. A so-called gimbal spring, not shown, is coupled to the front or tip end of the head suspension 25. A flying head slider 26 is fixed to the surface of the gimbal spring. The gimbal spring allows the flying head slider 26 to change its attitude relative to the head suspension 25.

An electromagnetic transducer, not shown, is mounted on the flying head slider 26. The electromagnetic transducer includes a write element and a read element. The write element may include a thin film magnetic head designed to write magnetic bit data into the magnetic recording disk 13 by utilizing a magnetic field induced at a thin film coil pattern. The read element may include a giant magnetoresistive (GMR) element or a tunnel-junction magnetoresistive (TMR) element designed to discriminate magnetic bit data on the magnetic recording disk 14 by utilizing variation in the electric resistance of a spin valve film or a tunnel-junction film, for example.

When the magnetic recording disk 13 rotates, the flying head slider 26 is allowed to receive an airflow generated along the rotating magnetic recording disk 13. The airflow serves to generate a positive pressure or a lift as well as a negative pressure on the flying head slider 26. The flying head slider 26 is thus allowed to keep flying above the surface of the magnetic recording disk 13 during the rotation of the magnetic recording disk 13 at a higher stability established by the balance between the urging force of the head suspension 25 and the combination of the lift and the negative pressure.

A power source or voice coil motor, VCM, 27 is coupled to the carriage block 22. The voice coil motor 27 serves to drive the carriage block 22 around the vertical support shaft 23. The rotation of the carriage block 22 allows the carriage arms 24 and the head suspensions 25 to swing. When the carriage arm 24 swings around the vertical support shaft 23, the flying head slider 26 is allowed to move along the radial direction of the magnetic recording disk 13. The electromagnetic transducer on the flying head slider 26 can thus be positioned right above a target recording track on the magnetic recording disk 13.

A load tab 28 is attached to the front or tip end of the individual head suspension 25. The load tab 28 is designed to extend further forward from the tip end of the head suspension 25. The swinging movement of the carriage arm 24 allows the load tab 28 to move along the radial direction of the magnetic recording disk 13. A ramp member 29 is located on the movement path of the load tab 28 in a space outside the magnetic recording disk 13. The tip end of the ramp member 29 is opposed to the non-data zone 19 in a space outside the outermost recording track 16. The combination of the ramp member 29 and the load tab 28 establishes a so-called load/unload mechanism. The ramp member 29 may be made of a hard plastic, for example.

Figure 2:
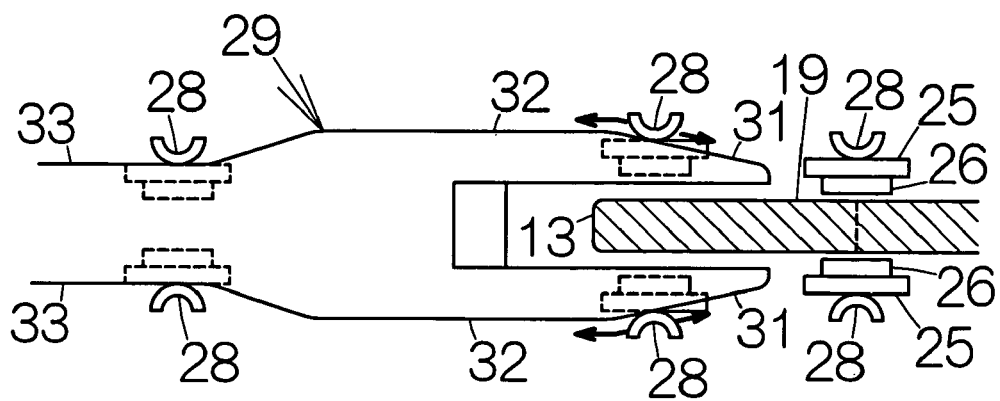
FIG. 2 is a side view of a ramp member.

Now, assume that the magnetic recording disk or disks 13 stop rotating. When the read/write operation has been completed, the voice coil motor 27 drives the carriage 21 for swinging movement around the support shaft 23 in the normal direction. The carriage arms 24 and the head suspensions 25 are driven outward from the magnetic recording disk or disks 13. As shown in FIG. 2, when the flying head sliders 26 get opposed to the landing zones or non-data zones 19 outside the outermost recording tracks 16, the load tabs 28 contact with inclined surfaces 31. A further swinging movement of the carriage arms 24 allows the load tabs 28 to climb up the corresponding inclined surfaces 31. The tip ends of the head suspensions 25 get remoter from the corresponding surfaces of the magnetic recording disk or disks 13 as the load tabs 28 climb up the inclined surfaces 31. The flying head sliders 26 are in this manner distanced away from the corresponding surfaces of the magnetic recording disk or disks 13.

A further swinging movement of the carriage arms 24 in the normal direction allows the load tabs 28 to slide from first flat surfaces 32 to second flat surfaces 33. When the load tabs 28 reach the farthest position from the magnetic recording disk or disks 13, the flying head sliders 26 reach the standby position. The load tabs 28 are in this manner received on the ramp member 29. The magnetic recording disk or disks 13 then stop rotating. Since the load tabs 28 are reliably held on the ramp member 29, the flying head sliders 26 are prevented from contacting with the magnetic recording disk or disks 13 even without any airflow acting on the flying head sliders 26. The flying head sliders 26 are thus effectively prevented from any attachment to a lubricant agent covering over the surfaces of the magnetic recording disk or disks 13.

When the hard disk drive 11 receives instructions for the read/write operation, the magnetic recording disk or disks 13 first start rotating. The voice coil motor 27 drives the carriage 21 around the support shaft 23 in the reverse direction opposite to the normal direction after the rotation of the magnetic recording disk or disks 13 has entered a steady condition. The carriage arms 24 and the head suspensions 25 are driven toward the rotation axis of the magnetic recording disk or disks 13. The load tabs 28 slide along the second flat surfaces 33, the first flat surfaces 32 and the inclined surfaces 31 in this sequence. A further swinging movement of the carriage arms 24 allows the load tabs 28 to move down the inclined surfaces 31. The flying head sliders 26 get opposed to the corresponding surfaces of the magnetic recording disk or disks 13 during the downward movement of the load tabs 28. Airflow acts on the flying head sliders 26 along the surfaces of the rotating magnetic recording disk or disks 13 for generating a lift on the flying head sliders 26. A further swinging movement of the carriage arms 24 then allows the flying head sliders 26 to take off from the ramp member 29. The flying head sliders 26 are thus allowed to keep flying above the surfaces of the rotating magnetic recording disk or disks 13 based on the generated lift.

Figure 3:
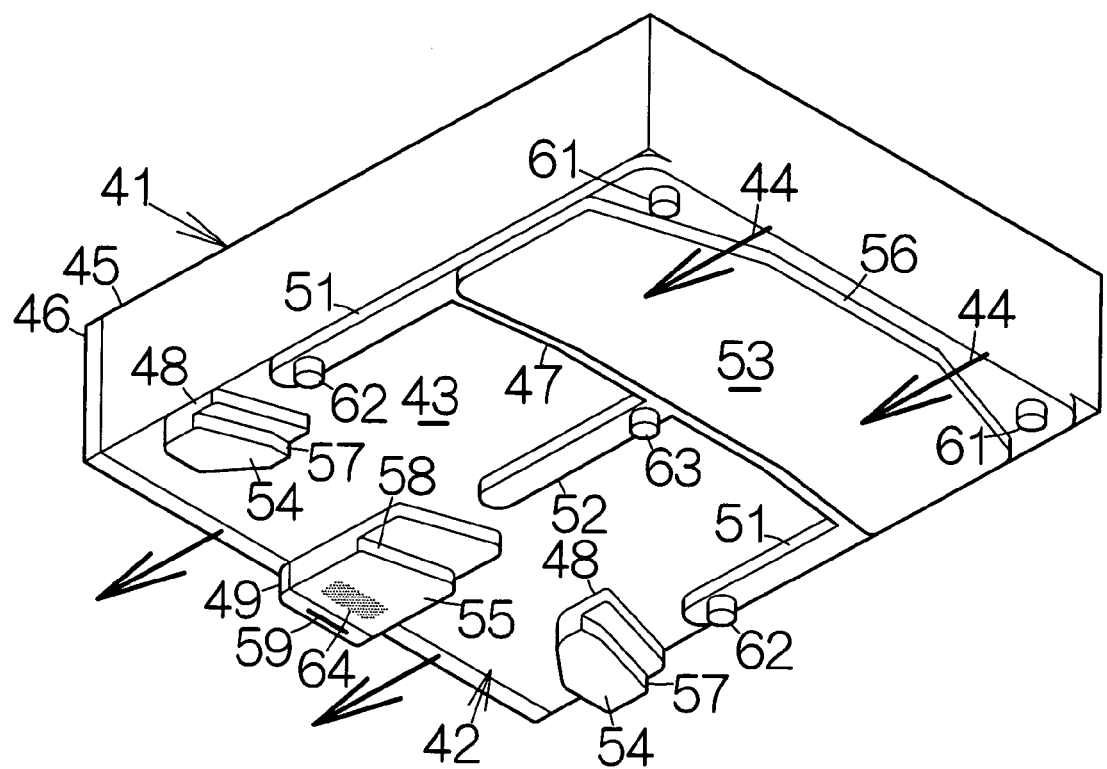
FIG. 3 is an enlarged perspective view of a flying head slider.

A detailed description will be made on the structure of the flying head slider 26. As shown in FIG. 3, the flying head slider 26 includes a slider body 41 in the form of a flat parallelepiped, for example. The slider body 41 is designed to oppose a medium-opposed surface, namely a bottom surface 42, to the surface of the magnetic recording disk 13. The bottom surface 42 includes a flat base surface 43. When the magnetic recording disk 13 is driven to rotate, an airflow 44 flows along the bottom surface 42 from the front or inflow end to the rear or outflow end of the slider body 41. Here, the slider body 41 may include a base mass 45 made of $Al_2O_3$-Tic and an $Al_2O_3$ (alumina) film 46, for example. The alumina film 46 may be overlaid on the outflow or trailing end of the base mass 45.

A front rail 47 is formed on the bottom surface 42 of the slider body 41. The front rail 47 stands upright from the base surface 43 at a position near the upstream or inflow end of the slider body 41. The front rail 47 is designed to extend along the inflow end of the base surface 43 in the lateral direction perpendicular to the direction of the airflow 44. A pair of rear side rails 48, 48 also stands upright from the base surface 43 at positions near the downstream or outflow end of the slider body 41. The rear side rails 48 are located near the side edges of the base surface 43, respectively. A rear center rail 49 stands upright from the base surface 43 at a position between the rear side rails 48. The rear center rail 49 is designed to extend upstream in the longitudinal direction from the outflow end toward the inflow end of the base surface 43.

A pair of side rails 51, 51 is connected to the front rail 47. The side rails 51 stand upright from the base surface 43. The side rails 51, 51 are designed to extend downstream along the side edges of the base surface 43 in the longitudinal direction from the front rail 47 toward the rear side rails 48, 48, respectively. A gap is defined between the side rails 51, 51 and the corresponding rear side rails 48, 48, respectively. The gaps allow airflow to run through between the side rails 51 and the corresponding rear side rails 48, respectively. A center rail 52 is also connected to the front rail 47. The center rail 47 stands upright from the base surface 43 at a position between the side rails 51. The center rail 52 is designed to extend downstream in the longitudinal direction from the front rail 47 toward the rear center rail 49. A gap is defined between the center rail 52 and the rear center rail 49. The side rails 51, 51 and the center rail 52 may extend in parallel with each other.

So-called air bearing surfaces 53, 54, 55 are defined on the top surfaces of the front rail 47, the rear side rails 48 and the rear center rail 49, respectively. The air bearing surfaces 53, 54, 55 are designed to extend within a plane extending in parallel with the base surface 43 at a position distanced from the base surface 43 at a certain interval. Steps 56, 57, 58 are formed at the inflow ends of the air bearing surfaces 53, 54, 55 so as to connect the inflow ends to the top surfaces of the corresponding rails 47, 48, 49, respectively. Here, the steps 56, 57, 58 may have an identical height.

The aforementioned read/write electromagnetic transducer 59 is mounted on the slider body 41. The read/write electromagnetic transducer 59 is embedded in the alumina film 46 of the slider body 41. A read gap and a write gap of the read/write electromagnetic transducer 59 are exposed at the air bearing surface 55 of the rear center rail 49. A DLC (diamond-like-carbon) protecting film may be formed on the surface of the air bearing surface 55 to cover over the front end of the read/write electromagnetic transducer 59.

The airflow 44 is generated along the surface of the rotating magnetic recording disk 13. The airflow 44 flows along the bottom surface 42 of the slider body 41. The steps 56, 57, 58 serve to generate a relatively large positive pressure or lift on the air bearing surfaces 53, 54, 55, respectively. A negative pressure is generated behind the front rail 47. The flying head slider 26 can thus be kept at a flying attitude defined by a pitch angle α based on the balance between the lift and the negative pressure. The slider body 41 allows its outflow end to get closest to the magnetic recording disk 13.

Pads 61, 62, 63 are formed on the top surfaces of the rails 47, 51, 52, respectively. The pads 61, 62, 63 are distanced from the air bearing surfaces 53, 54, 55, respectively. The tip ends of the pads 61, 62, 63 are located within a plane extending in parallel with the base surface 43 at a position distanced from the base surface 43 beyond the plane including the air bearing surfaces 53, 54, 55. The pads 61, 62, 63 serve to support the slider body 41 above the surface of the magnetic recording disk 13 when the flying head slider 26 is received on the surface of the magnetic recording disk 13. The air bearing surfaces 53, 54, 55 are thus prevented from contact with the surface of the magnetic recording disk 13. The contact area is significantly reduced between the slider body 41 and the magnetic recording disk 13. The slider body 41 is effectively prevented from any attachment to a lubricant agent covering over the surface of the magnetic recording disk 13. Here, it should be noted that the flying head slider 26 may take any shape or form different from the described one.

A charge region 64 is established in the bottom surface 42 at a local area distanced from the read/write electromagnetic transducer 59 in the flying head slider 26. The charge region 64 holds electric charges. Atomic ions are implanted into the bottom surface 42 for the establishment of the electric charges, for example. Here, the charge region 64 of $B^+$ or $As^+$ is formed in the air bearing surface 55 on the base mass 45.

Ion implantation may be employed to form the charge region 64, for example. Ion implantation may be conducted when the bottom surface 42 is shaped. A wafer bar including a group of the flying head sliders 26 in a row may be cut out of a wafer in a conventional manner prior to the ion implantation. A resist film is then formed on the surface of the wafer bar, corresponding to the bottom surfaces 42 of the flying head sliders 26, for example. The resist film serves to define voids corresponding to the extents of the charge regions 64. The individual void is distanced from the corresponding read/write electromagnetic transducer 59 at a distance of 1 μm approximately, for example. Atomic ions are implanted into the wafer bar within the voids. The air bearing surfaces 53, 54, 55 may be carved out of the bottom surface 42 either after or before the ion implantation.

Figure 4:
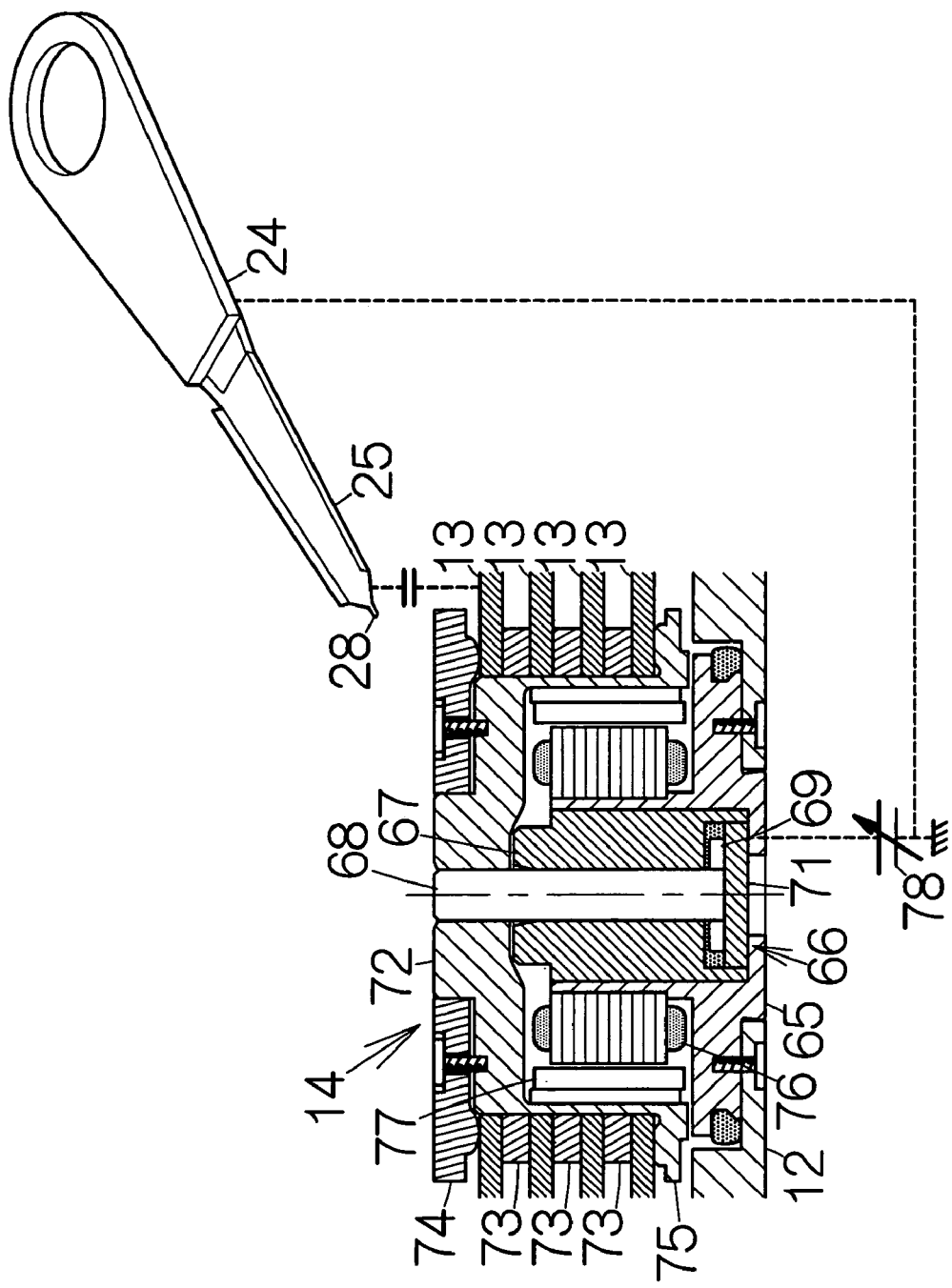
FIG. 4 is an enlarged partial sectional view of the hard disk drive for schematically illustrating a fluid bearing in a spindle motor in combination with a schematic view of a carriage.

Next, a detailed description will be made on the spindle motor 14. As shown in FIG. 4, the spindle motor 14 includes a bracket 65 fixed to the bottom plate of the enclosure 12. A so-called fluid bearing 66 is incorporated in the bracket 65. A rotation shaft 68 is received in a cylindrical space within a sleeve 67 in the fluid bearing 66. A fluid such as a lubricant fills a gap between the sleeve 67 and the rotation shaft 68, for example. The rotation shaft 68 is allowed to rotate around its longitudinal axis at a high revolution speed in the sleeve 67. A thrust flange 69 is attached to the lower end of the rotation shaft 68. The thrust flange 69 is designed to extend in a centrifugal direction from the longitudinal axis of the rotation shaft 68. The thrust flange 69 is received on a thrust plate 71. The fluid also fills a gap between the thrust flange 69 and the thrust plate 71.

A spindle hub 72 is mounted on the rotation shaft 68. The magnetic recording disks 13 are mounted on the spindle hub 72, for example. A spacer 73 is interposed between the adjacent ones of the magnetic recording disks 13. The magnetic recording disks 13 and the spacers 73 are interposed between a clamp 74 and a flange 75. Screws may be utilized to fix the clamp 74 to the spindle hub 72, for example.

Coils 76 are fixed to the bracket 65 around the rotation shaft 68. Permanent magnets 77 are fixed to the spindle hub 72. The permanent magnets 77 are located on the inside surface of the spindle hub 72 so that the permanent magnets 77 can be opposed to the coils 76. Magnetic field is generated in the coils 76 in response to the supply of electric current. The magnetic field of the coils 76 serves to drive the permanent magnets 77. The spindle hub 72 is thus driven for rotation around the longitudinal axis of the rotation shaft 68. The magnetic recording disks 13 thus rotate.

A voltage source 78 is connected to the fluid bearing 66. Voltage is applied to the fluid bearing 66 from the voltage source 78. Here, the sleeve 67, the thrust plate 71, the rotation shaft 68 and the spindle hub 72 are made of an electrically-conductive material such as a metal material, for example. The fluid has a predetermined conductivity. The voltage is thus transmitted to the magnetic recording disks 13 from the voltage source 78. The voltage source 78 may be connected between the sleeve 67 and the ground, between the thrust plate 71 and the ground, or the like. As long as the voltage is kept applied to the magnetic recording disks 13, the voltage source 78 may not necessarily be connected to the fluid bearing 66. Moreover, any of the sleeve 67, the thrust plate 71, the rotation shaft 68 and the spindle hub 72 may not have an electrical conductivity as long as the voltage is kept applied to the magnetic recording disks 13.

When electric potential is applied to the magnetic recording disks 13 from the voltage source 78 during the flight of the flying head sliders 26, capacitance is stored between the surfaces of the magnetic recording disks 13 and the charge regions 64 of the corresponding flying head sliders 26. Application of a negative potential leads to generation of attraction. Application of a positive potential leads to generation of repulsion. A larger magnitude or absolute value of the negative or positive potential leads to a larger attraction or repulsion. The flying height of the flying head sliders 26 depends on the balance between the attraction or repulsion and the combination of the lift and the negative pressure generated by the airflow 44. The controlled attraction or repulsion serves to minimize the flying height of the flying head sliders 26. The flying head sliders 26 are allowed to reliably get closer to the corresponding surfaces of the magnetic recording disks 13. The reduction in the flying height significantly contributes to realization of a higher recording density.

Figure 5:
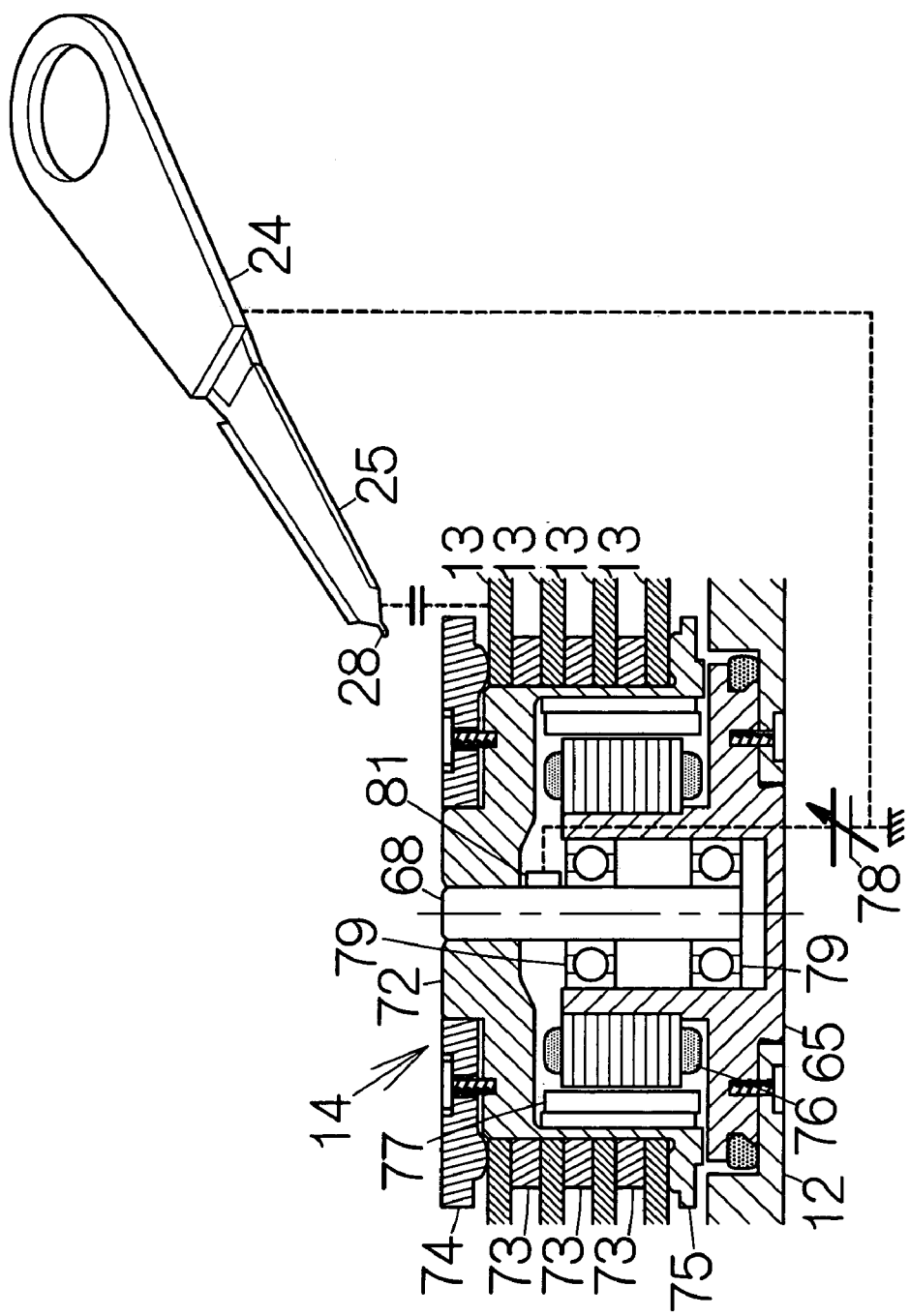
FIG. 5 is an enlarged partial sectional view of the hard disk drive for schematically illustrating ball bearings in the spindle motor in combination with a schematic view of the carriage.

As shown in FIG. 5, a pair of ball bearings 79, 79, namely upper and lower ball bearings 79, 79, may be employed in place of the aforementioned fluid bearing 66, for example. In this case, the voltage source 78 is connected to the rotation shaft 68. A sliding pad 81 is utilized for the connection. The sliding pad 81 is urged against the outer surface of the rotation shaft 68 by a predetermined elastic force. The sliding pad 81 is thus forced to contact with the outer surface of the rotating rotation shaft 68. The voltage is applied to the magnetic recording disks 13 from the voltage source 78 through the sliding pad 81, the rotation shaft 68 and the spindle hub 72 in this sequence. A conventional grounding pad in a hard disk drive can be utilized as the sliding pad 81.

The present inventor has observed effects of the charge region 64. The aforementioned hard disk drive 11 was prepared for the observation. The ion implantation of $B^+$ was implemented to establish the charge region 64. The output level of the ion implantation was set at 5 [MeV]. The density was set at $5\times10^3$ [ions/cm$^3$]. The flying height of the flying head slider 26 was measured in the hard disk drive 11. The output level of a read signal was measured for the measurement of the flying height. The measured output level was converted into the flying height. The relative speed was set at 21.4 [m/sec] between the magnetic recording disk 13 and the flying head slider 26.

Figure 6:
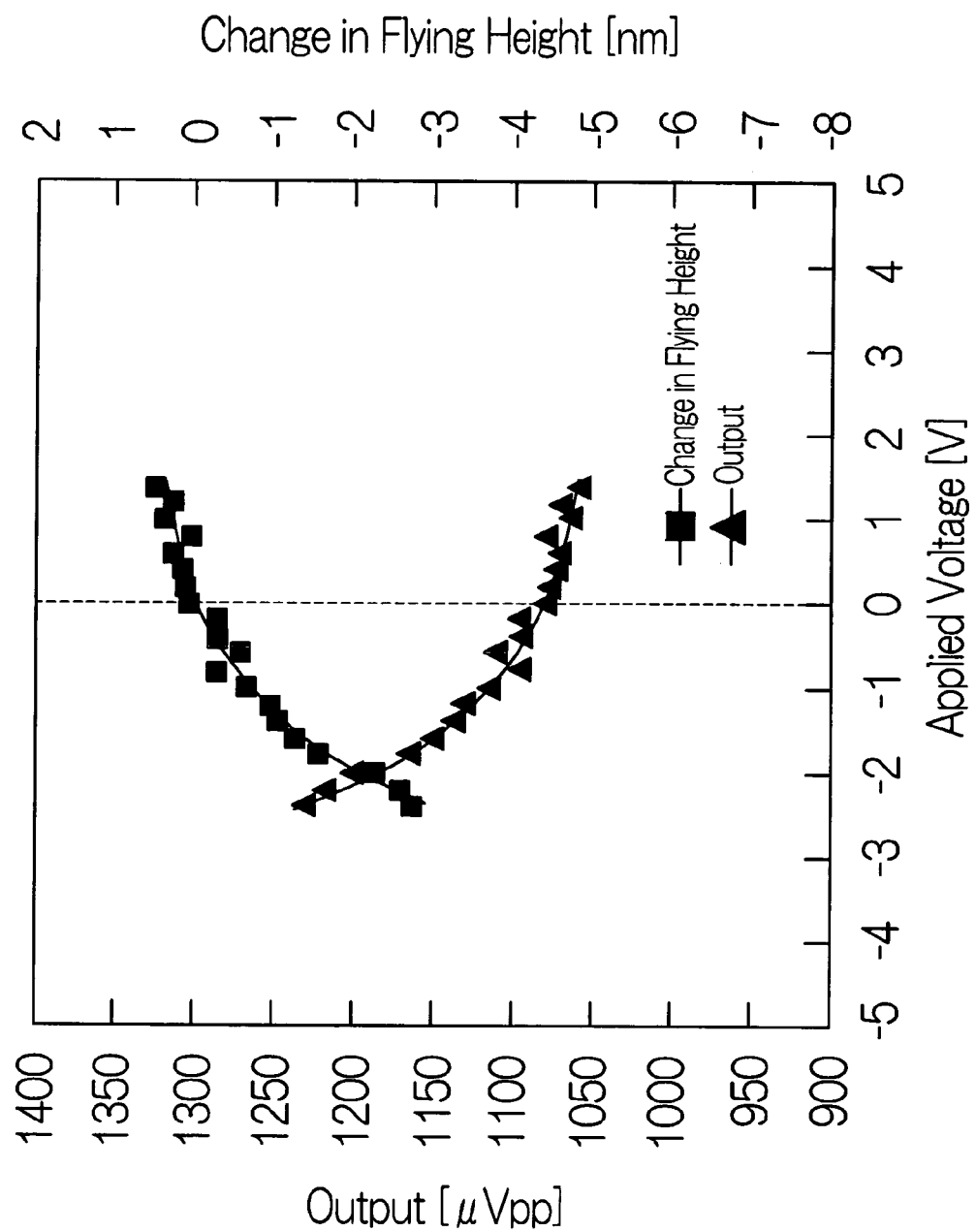
FIG. 6 is a graph showing the relationship between the voltage applied to the magnetic recording disk and the flying height of the flying head slider.

As shown in FIG. 6, it has been confirmed that the flying height of the flying head slider 26 depends on the polarity and the magnitude of the electric potential applied to the magnetic recording disk 13. No electrospark was observed between the flying head slider 26 and the magnetic recording disk 13 even when the magnetic recording disk 13 was subjected to the voltage of 4[V]. The present inventor was also prepared a comparative example for the observation. The charge region 64 was omitted from a flying head slider in the comparative example. Voltage was applied to a space between the flying head slider and the magnetic recording disk in the comparative example. The present inventor observed with an electron microscope a read/write electromagnetic transducer of the flying head slider according to the comparative example after the application of the voltage of 4[V]. Destruction or burn was observed in the read/write electromagnetic transducer of the comparative example. This means that the read/write electromagnetic transducer inevitably suffered from electrospark.

Figure 7:
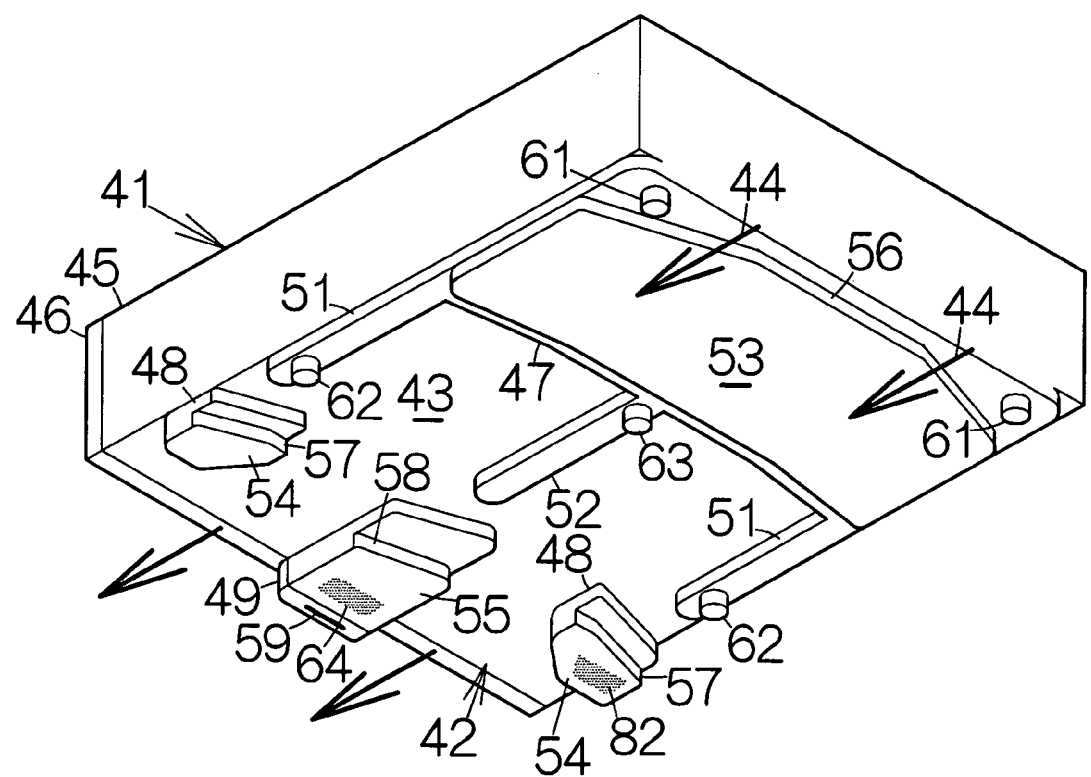
FIG. 7 is an enlarged perspective view of a flying head slider according to a modified embodiment of the present invention.

As shown in FIG. 7, a charge region 82 may be established on the air bearing surface or surfaces 54 of one or both of the rear side rails 48 in the aforementioned flying head slider 26, for example. The charge region or regions 82 serve to reduce the roll of the flying head slider 26. Here, the term "roll" is defined as a rotating movement around the longitudinal centerline extending from the inflow end to the outflow end of the slider body 41.

Figure 8:
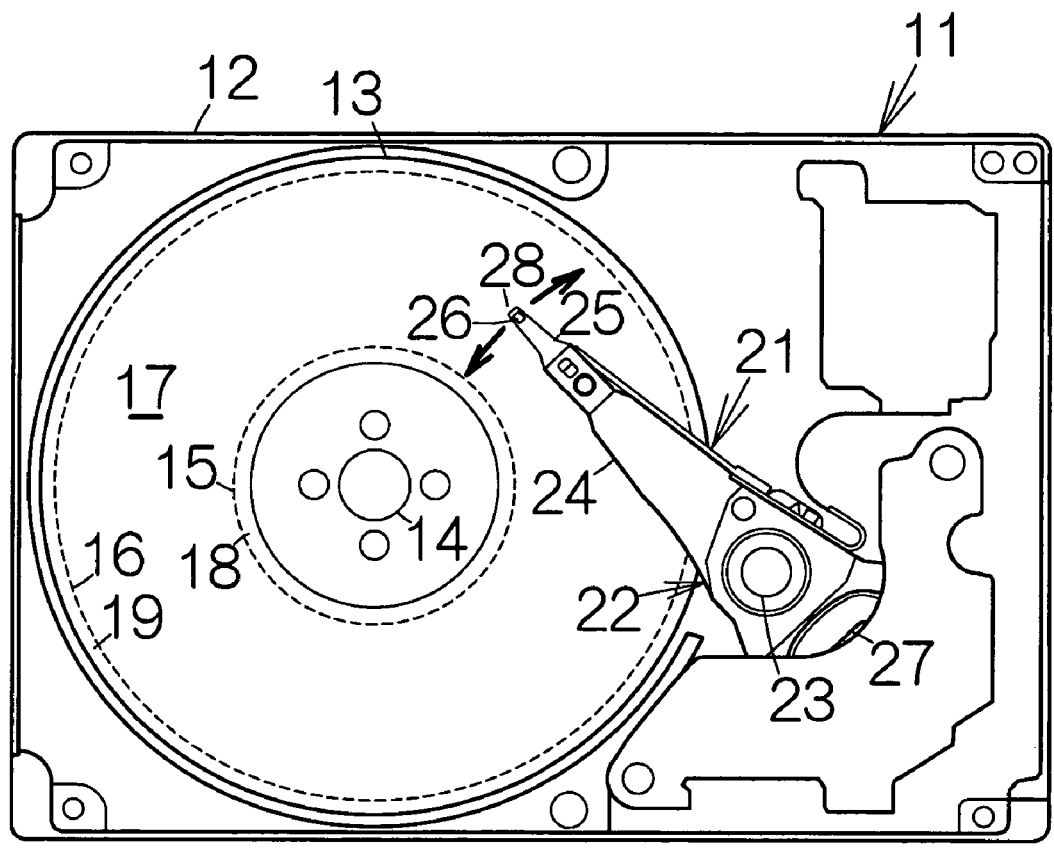
FIG. 8 is a plan view schematically illustrating the inner structure of a hard disk drive as an example of a recording medium drive according to another modified embodiment of the present invention.

As shown in FIG. 8, the load/unload mechanism including the load tab 28 and the ramp member 29 may be omitted in the aforementioned hard disk drive 11, for example. In this case, a positive potential should be kept applied to the magnetic recording disk or disks 13 when the magnetic recording disks 13 stand still. The applied positive potential serves to generate a repulsion between the magnetic recording disk or disks 13 and the charge regions 64 of the corresponding flying head sliders 26. The flying head sliders 26 are thus prevented from contacting with the magnetic recording disk or disks 13 even without any airflow acting on the flying head sliders 26.

What is claimed is:
1. A head slider comprising:
a slider body having a medium-opposed surface opposed to a recording medium;
a head element mounted on the slider body; and
a charge region holding an electric charge at a local area in the medium-opposed surface of the slider body, said charge region located at a position distanced from the head element, wherein the slider body includes atomic ions implanted into the medium-opposed surface so as establish the electric charge.

2. The head slider according to claim 1, wherein the charge region is located in an air bearing surface defined in the medium-opposed surface.

3. The head slider according to claim 1, further comprising:
a pair of rear side rails formed on the slider body at opposite side edges of the medium-opposed surface, wherein the charge region is established on at least one of the rear side rails.

4. A recording medium drive comprising:
a recording medium;
a head slider having a medium-opposed surface opposed to the recording medium;
a head element mounted on the head slider;
a charge region holding an electric charge at a local area in the medium-opposed surface of the head slider, said charge region located at a position distanced from the head element; and
a voltage source applying voltage to the recording mediums,
wherein the head slider includes atomic ions implanted into the medium-opposed surface so as to establish the electric charge.

5. The recording medium drive according to claim 4, wherein the charge region is located in an air bearing surface defined in the medium-opposed surface.

6. The recording medium drive according to claim 4, further comprising:
a pair of rear side rails formed on the slider body at opposite side edges of the medium-opposed surface, wherein the charge region is established on at least one of the rear side rails.

* * * * *